Nov. 5, 1940.   L. E. SEELEY   2,220,584
HEATING DEVICE
Filed Sept. 23, 1937   2 Sheets-Sheet 1
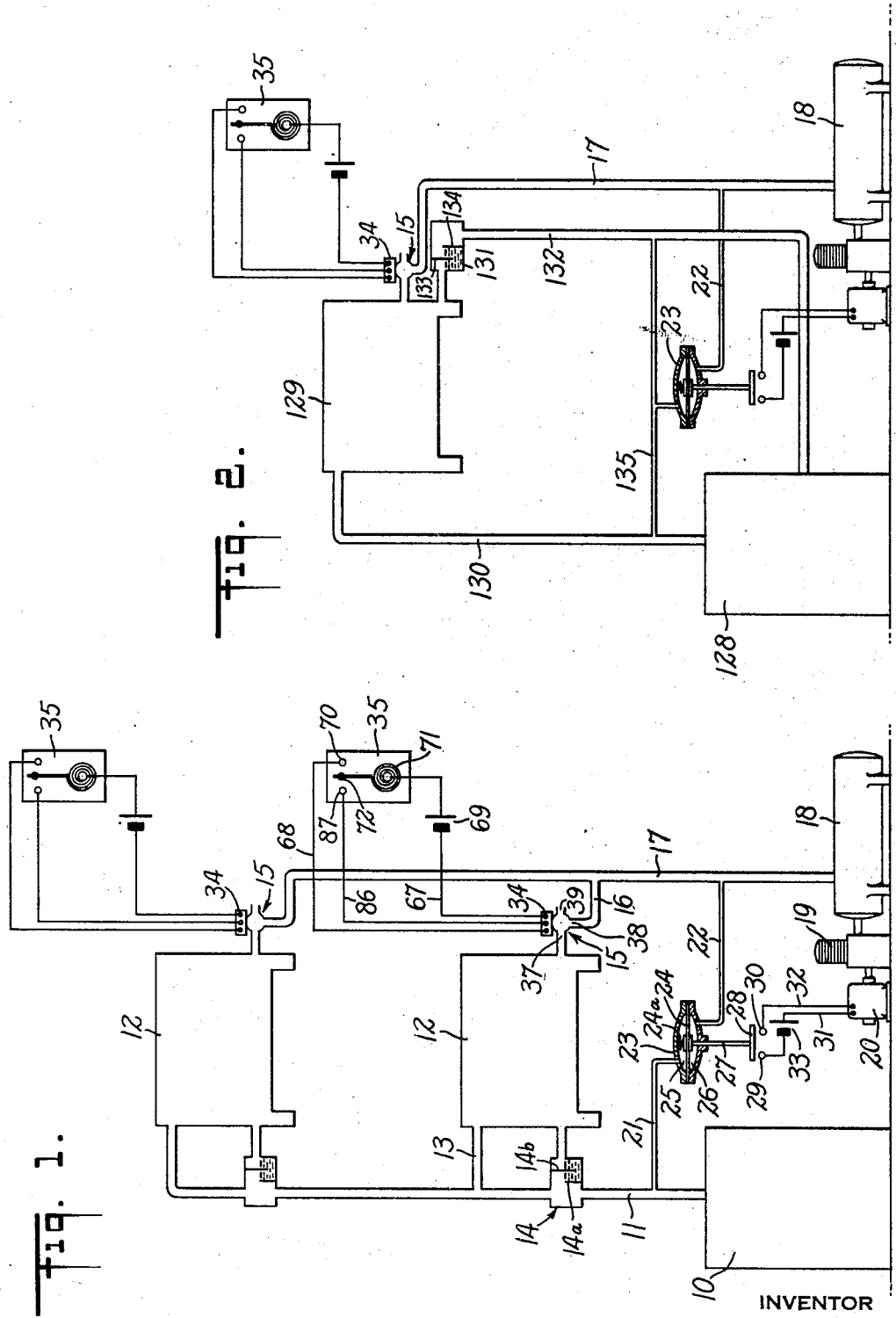
INVENTOR
Lauren E. Seeley
BY
Blair, Curtis, Dunne & Hayward
ATTORNEYS Nov. 5, 1940.  L. E. SEELEY  2,220,584
HEATING DEVICE
Filed Sept. 23, 1937   2 Sheets-Sheet 2
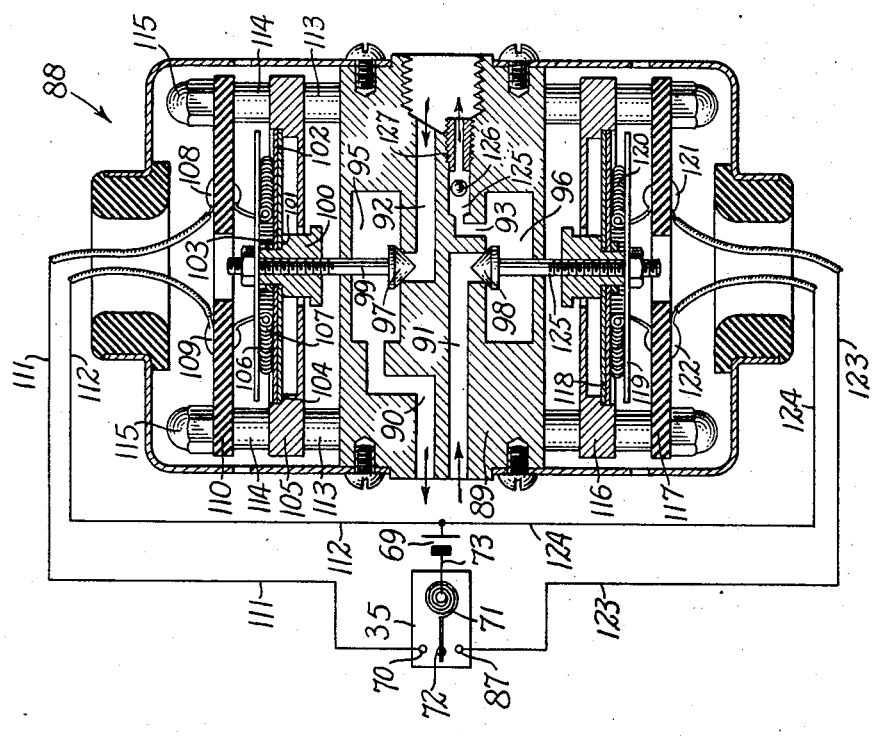
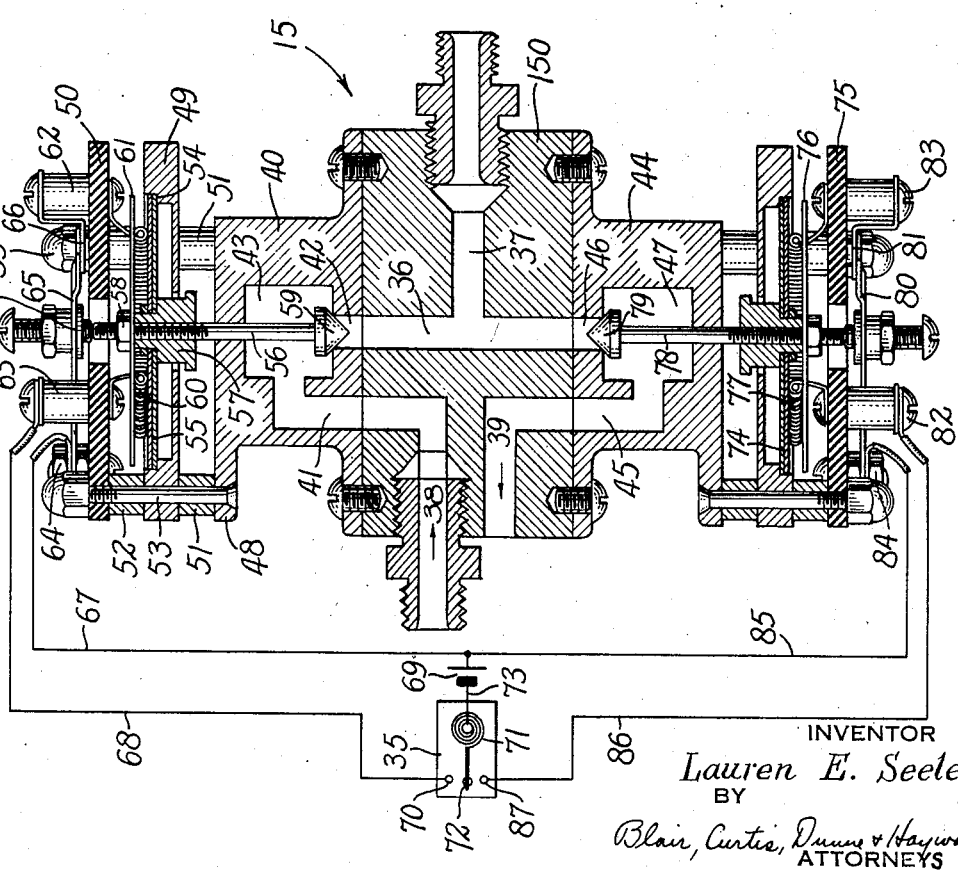
INVENTOR
Lauren E. Seeley
BY
Blair, Curtis, Dunne & Hayward
ATTORNEYS Patented Nov. 5, 1940

2,220,584

UNITED STATES PATENT OFFICE 2,220,584

HEATING DEVICE

Lauren E. Seeley, New Haven, Conn.

Application September 23, 1937, Serial No. 165,283

6 Claims. (Cl. 237—10)

This invention relates to a heating system.

One of the objects of this invention is to provide a heating system which is inexpensive in construction and operation and which operates economically and efficiently over extended periods of time. Another object is to provide a heating system which is thoroughly reliable under varying weather conditions. Another object is to provide a heating system by which an even, desired temperature can be maintained. Another object is to provide a heating system which can be automatically controlled within narrow limits. Other objects will be in part apparent and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which are shown several of the various possible embodiments of my invention;

Figure 1 is a diagrammatic view of a one-pipe steam heating system having control equipment applied thereto;

Figure 2 is a diagrammatic view of a two-pipe heating system with control equipment applied thereto;

Figure 3 is a partially diagrammatic sectional elevation of a regulating valve for either of the systems shown in Figures 1 and 2; and, Figure 4 is a partially diagrammatic sectional elevation of a modified form of the valve shown in Figure 3.

Similar reference characters refer to similar parts throughout the various views of the drawings.

As conducive to a clearer understanding of certain features of this invention, it might be noted that where it is desired to maintain a temperature level in a space, the heat radiation of the radiator should correspond to the heat loss from the space. The amount of radiation for a given space is usually apportioned to radiate sufficient heat to compensate the heat loss in severe weather. It follows that this maximum radiation is often greatly in excess of that needed in less severe weather, and accordingly the radiation should be controlled. Various systems and methods are used in an attempt to control heat radiation, one system being characterized by intermittent heating of the radiator to provide a desired average output. This system is objectionable, however, in that the irregular rate of heat supply inevitably results in uneven temperature. For example, if a temperature of 70° F. is desired, and the temperature of the space is below 70° F., steam is supplied to the radiator to raise the temperature. When the desired temperature is reached, however, the radiator continues to emit undesired heat, which causes "over-shooting" of several degrees. Similarly, where the actual temperature is above that desired, and the radiator is permitted to cool, the cooling effect continues below the desired temperature, this condition sometimes being referred to as "cold 70."

Other systems employ partial radiator heating, which requires a steady source of steam, the flow of which to the radiators is constricted to the rate desired. Such constrictions are often noisy, become clogged, and are otherwise troublesome and objectionable. Furthermore, they often need manipulation which the average individual is incapable of properly effecting.

Still other systems are characterized by controls for regulating the pressure of the steam in the radiator and this necessitates control of steam pressures which are sub-atmospheric. Such systems are usually objectionably complicated, expensive and are subject to only limited control.

It is accordingly another object of this invention to provide a heating system and method of heating which obviates the above difficulties, in addition to many others.

Referring now to Figure 1 of the drawings, a steam boiler 10 has connected thereto a riser 11 which communicates with any desired number of radiators 12. Radiator 12 is connected to riser 11 by a steam inlet 13 and a trap generally indicated at 14, the purpose of which will be pointed out hereinafter. Thus steam generated in boiler 10 flows upwardly through riser 11 and enters radiator 12 by way of inlet 13, the condensate flowing from the bottom of the radiator through trap 14 and back to the boiler through riser 11.

Steam will flow into radiator 12 as long as there is no air trapped in the radiator. Because of different specific gravities of steam and air, any air trapped in radiator 12 will lie in the bottom thereof and prevent entry of steam, unless the air can escape. Accordingly, that part of the radiator in which the air is trapped will not emit heat. From this it follows that by controlling the amount of air in the radiator, the amount of effective heating surface thereof can be completely controlled.

To this end, still referring to Figure 1, I have provided an air valve generally indicated at 15 and having an electric operator 34. The valve is preferably connected to the radiator at the opening commonly provided for a valve, this opening generally being about a third of the distance from the bottom of the radiator. Valve 15 is connected to an air inlet pipe 16, which is in turn connected to a main air line 17 joined to an air pressure tank 18. Air pressure in tank 18 is maintained by a suitable compressor 19 driven by a motor 20.

In order that air may flow into radiator 12, the air pressure must exceed the steam pressure. Accordingly, I have provided a pair of pipes 21 and 22 respectively connected to steam riser 11 and air line 17 with a regulator 23 interposed therebetween. Regulator 23 has a diaphragm 24 dividing it into a steam chamber 25 and an air chamber 26 respectively connected to pipes 21 and 22. Thus the pressures in steam chamber 25 and air chamber 26 correspond respectively with the steam pressure in riser 11 and air pressure in air line 17. A spring 24a is tensioned against diaphragm 24 pressing it toward air chamber 26 so that the air pressure must work against the steam pressure and the spring to force the diaphragm in the direction of the steam chamber. A stem 27 is suitably clamped to diaphragm 24 and a switch arm 28 is secured to the exposed end of stem 27. Thus when the air pressure in chamber 26 falls below a predetermined minimum, the steam pressure in chamber 25 forces diaphragm 24 downwardly causing arm 28 to bridge a pair of contacts 29 and 30. This closes a circuit to motor 20 including leads 31, 32 and a battery 33. When this circuit is closed, motor 20 operates compressor 19 to raise the air pressure in tank 18 until diaphragm 24 in valve 23 is forced upwardly by air pressure in excess of the steam pressure and the tension of spring 24a. Spring 24a is adjusted to allow for the maintenance of an air pressure in tank 18 and its connected parts somewhat in excess of the steam pressure; in fact this pressure must be high enough to drive steam from the radiators, as will be presently described.

As will be hereinafter described, valve 15 is suitably ported to permit flow of air into radiator 12 by way of pipe 16 and channels or ports 38 and 37 or to permit flow of air out of the radiator through channel or port 39 to the atmosphere. Ports 37 and 38 in valve 15 preferably are controlled by a double throw thermostatic switch 35 which is responsive to temperature conditions in the space to be heated. Switch 35 has a pair of stationary contacts 70 and 87 respectively connected to operator 34 by leads 68 and 86. The switch also has a movable contact 72 connected to a power source 69 which in turn is connected to operator 34 by a lead 67. A thermostatic bimetal arm 71, which moves in accordance with temperature changes, effects movement of movable contact 72 to engage either contact 70 or 87. Depending on which contact is engaged, one of two possible circuits including operator 34, may be established. Such circuits actuate valves 15 to let air into radiator 12 or permit escape of air therefrom, as will be described in detail hereinbelow. Thus, if heat is demanded by the thermostatic switch, a circuit is made to operator 34 to operate valve 15 which causes opening of connection of ports 37 and 39 to permit air to flow from radiator 12. If there is too much heat in the space, thermostatic switch 35 reacts to connect ports 37 and 38 in valve 15, thereby effecting a flow of air into radiator 12. Air thus displaces some of the steam in the radiator to reduce the effective heating area thereof.

As the air pressure exceeds the steam pressure, it is necessary to prevent inadvertent escape of air from radiator 12. For this purpose trap 14 is provided, the trap having suitable partitions 14a and 14b which trap condensate and form an air lock. When the space is at the desired temperature, thermostatic switch 35 opens and both ports 37 and 38 in valve 15 close. Thus the temperature of radiator 12 will remain substantially constant because steam may flow thereto and fill that part of the radiator not occupied by air. As the steam in the radiator condenses it is free to flow through trap 14 and back to the boiler. Consequently the radiator is constantly heated in contradistinction to intermittent heating thereof, thus avoiding the necessity for mechanism manually or automatically operable to shut off or open the steam supply. Also objectionable pounding noises are obviated. Furthermore, it is not necessary to constrict the flow of steam, i. e., vary the flow rate thereof.

Referring now to Figure 3, valve 15 comprises a body 150 in which are formed air channels or ports 36, 37, 38 and 39 (see Figure 1 for relationship of channels 37, 38 and 39 to radiator 12). A head 40 (Figure 3) is suitably secured to one side of valve body 150 and is provided with air channels 41 and 42 which connect with an air chamber 43 formed in the head. Channels 41 and 42 communicate with channels 38 and 36 respectively of valve body 150. A second head 44 is suitably secured to the other side of valve body 150, this head being provided with air channels 45 and 46 which communicate with an air chamber 47 and which register respectively with channels 39 and 36 in valve body 150. It will now appear that heads 40 and 44 are substantially similar and accordingly head 40 will hereinafter be termed the "inlet head" whereas head 44 will be termed the "outlet head."

Inlet head 40 is preferably provided with several projecting supports 48 to which are secured a mounting ring 49 and a supporting plate 50, ring 49 and plate 50 being held in spaced relationship on the top of head 40 by spacers 51 and 52. Screws 53 extend through plate 50, ring 49 and spacers 51 and 52 and are threaded into projecting supports 48 to hold the several parts in related assembly.

Mounting ring 49 has an annular shoulder 54 formed therein to support a bimetallic disc 55 which is centrally perforated to receive a valve stem 56, the disc being secured to the stem by suitable nuts 57 and 58 which are threaded on stem 56 to clamp disc 55 therebetween. The lower end of stem 56 carries a needle valve 59 which seats in channel 42 in a manner to be hereinafter described. The bimetallic disc is so formed that upon being heated it warps upwardly to raise valve stem 56 and needle valve 59.

To heat bimetallic disc 55 I provide a resistance coil 60 mounted on a suitable insulating disc 61 which is secured in any suitable manner to stem 56 so as to move therewith. The opposite ends of coil 60 are connected to terminals 62 and 63 which are mounted in any suitable manner in supporting plate 50.

I also prefer to mount on plate 50 a binding post 64 which holds one end of a contact 65, the other end of which is adapted to move into and out of engagement with a stationary contact 66 secured to terminal 62. The central portion 65a of contact 65 is suitably clamped to the upper end of valve stem 56 so that movement of the valve stem effects upward or downward movement of contact 65. A pair of leads 67 and 68 are secured respectively to binding post 64 and terminal 63, lead 67 connecting with one side of power source 69 and lead 68 connecting with a stationary contact 70 mounted in thermostatic switch 35. Thermostatic switch 35 includes a bimetal coil 71 which is responsive to variations in temperature to move a contact arm 72. Members 71 is connected to the other side of power source 69 by a lead 73. Thus when the temperature rises and less heat is desired, bimetal 71 moves contact 72 against contact 70, completing a circuit to resistance coil 60. This circuit includes lead 67, binding post 64, contact 65, contact 66 from the power source to the coil and terminal 63, lead 68, contacts 70 and 72 and lead 73 from the coil to the power source. Coil 60 thus heats bimetal disc 65 causing it to snap upwardly lifting needle valve 59 out of channel 42 and permitting communication between channels 41 and 42 by way of chamber 43.

Air channel 38 is suitably connected to air inlet 16 (Figure 1) and air channel 37 (Figure 3) is suitably connected to the radiator. Accordingly when needle valve 59 is lifted as above described, air flows through channels 38 and 41, chamber 43 and channels 42, 36 and 37 into radiator 12 (Figure 1). This flow of air is not steady, however, because when valve stem 56 (Figure 3) lifts needle valve 59 upwardly, contacts 65 and 66 are separated, breaking the circuit to resistance 60, which then cools to permit bimetal disc 55 to cool and snap back from its warped position. Thus needle valve 59 reseats in channel 42 and stops the flow of air from air line 16 to the radiator. However, when the needle valve is so seated, contacts 65 and 66 reengage to establish the circuit to resistance 60 which again heats bimetal disc 55, causing it to warp and reopen the valve. This intermittent opening and closing of the valve continues until the effective heating area of radiator 12 (Figure 1) has been sufficiently decreased to permit the temperature of the space to fall to the desired value. When this temperature is reached bimetal 71 (Figure 3) in thermostatic switch 35 reacts to separate contacts 70 and 72, thus breaking the circuit to the resistance and preventing further operation of the valve.

Because channel 42, into which needle valve 59 seats, is small, and also because of the intermittent operation of the valve, air is metered into the radiator at a relatively slow rate to decrease gradually the effective heating surface thereof. This gradual decrease corresponds more nearly to the normal heat loss of the space. The temperature of the radiator does not vary abruptly, so the heat output of the radiator substantially corresponds to the heat loss of the space when the critical temperature is reached; in this manner the "cold 70" condition mentioned above is avoided.

Referring to Figure 3, outlet head 44 of valve 15 is provided with mechanism substantially similar to that associated with inlet head 40. Thus there is secured to outlet head 44 a bimetal disc 74, a mounting plate 75, an insulating plate 76, a heating coil 77, a valve steam 78, a needle valve 79, contacts 80 and 81, terminals 82 and 83, a binding post 84, and leads 85 and 86. All of these parts are substantially identical to the analogous parts of inlet head 40 hereinbefore described, and operate in substantially the same manner.

Assuming that the temperature in the space to be heated rises above the desired degree, the thermostat bimetal 71 moves contact 72 against contact 87, thus completing a circuit from power source 69 to resistance 77. This circuit includes lead 85, post 84, contacts 80 and 81 from the power source to the resistance, and terminal 82, lead 86, contacts 87 and 82, coil 71 and lead 73 from the resistance to the power source. When bimetal disc 74 becomes heated it warps downwardly as viewed in Figure 3 and draws needle valve 79 out of channel 46 thus connecting channels 45 and 46 by way of chamber 47. Channel 45 communicates with exhaust channel 39 (Figure 1). Thus air is free to flow from the radiator through channels 37 and 46 (Figure 3), chamber 47, and channels 45 and 39 to the atmosphere. However, when valve stem 78 moves to unseat needle valve 79, contacts 80 and 81 are disengaged, thus breaking the circuit to resistance 77 to permit bimetal disc 74 to cool off and seat needle valve 79 in channel 46. Thus needle valve 79 seats and unseats intermittently as described above with respect to needle valve 59, and when sufficient air has escaped in intermittent flow from the radiator so that the effective heating surface thereof has increased sufficiently to attain the desired temperature, thermostat bimetal 71 reacts to disengage contacts 72 and 87 to break the circuit of resistance 77 and prevent further escape of air from the radiator.

As pointed out above the size of the channels in the valve are relatively small; hence because of the size of channel 46 and the intermittent operation of needle valve 79 the rate of air flow from the radiator is relatively slow. Also because of the intermittent operation of needle valve 79, the heating effect resulting from each actuation of the valve has a certain amount of time to take effect before the needle valve again is operated, i. e., between successive closings of the valve, the amount of air displaced from the radiator is proportionate to the additional amount of steam which may enter by reason of the displacement of the air. While the valve is closed this additional steam increases the effective heating surface or area of the radiator and the additional heat units may be enough without a further actuation of the valve to raise the temperature to its critical point where the thermostat is affected to stop the operation of the air valve. If the thermostat is so affected, a further actuation of the valve to increase the effective heating surface is prevented, and the condition above referred to as "overshooting" is prevented. Accordingly the temperature of the radiator does not exceed the desired degree and the temperature of the space does not rise above the predetermined desired value, all which results in a smooth, graduated control.

It should also be noted that the relatively inexpensive one-pipe system is ideally suited to this method of control, although the two pipe system can also be used, as described hereinbelow. Furthermore where an intermittently operated fuel burner, such as an oil burner or a coal stoker, is used in conjunction with conventional heating systems, all radiators do not heat up at the same time and often the more remote radiators do not get enough heat. This results in uneven and unsatisfactory temperatures throughout the building. With my system, more or less steam is in every radiator all of the time, each according to its need. Also the alternate heating up and cooling down which characterizes the conventional intermittent systems causes banging and knocking in the pipes and radiators. Since there is no alternate heating and cooling in my system, in respect to the fuel burner, the objectionable noises are precluded as the flow of steam to the radiators is steady and in the exact amount required, and the load on the boiler can never exceed the radiator load plus piping. From this it follows that a smaller boiler can be used or a smaller flame can be used in a converted boiler, thus giving higher efficiency. Also the boiler need not have great pick-up or heating-up capacity and thus a boiler whose original capacity was too small for its load will operate efficiently where my system is employed.

It may now be seen that the intermittent inflow and outflow of air to and from the radiator results in an extremely sensitive regulation of the effective heating surface thereof, and the desired temperature of the space is maintained at a substantially constant degree. In this connection it might be noted that the intermittent systems commonly use only one thermostat to control the boiler heater thus to regulate temperatures for an entire house or building. Obviously different temperatures will prevail in different portions of the house, regardless of the temperature desired because of factors of exposure, window openings, etc. When my heating system is used, radiation is proportioned according to the needs of each room. Individual room temperature control is one of the best features of my heating system and serves further to distinguish it from the conventional intermittent systems, as will be described in greater detail hereinbelow.

Because of the intermittent making and breaking of contacts 65 and 66 and contacts 80 and 81 of valve 15 (Figure 3) a certain amount of interference is created which might affect radio reception. Such interference might be eliminated in the valve shown in Figure 3. However, I have provided a valve generally indicated at 88 (Figure 4) which cuts down such interference considerably.

This valve comprises a valve body 89 having air channels 90, 91, 92, and 93. Channels 90 and 91 communicate respectively with a pair of air chambers 95 and 96, channels 92 and 93 also communicating respectively with chambers 95 and 96. The ends of channels 91 and 92 provide convenient valve ports in which a pair of needle valves 97 and 98 seat respectively. Needle valve 97 is secured to one end of a threaded valve stem 99, the upper end of which receives a nut 100. Nut 100 has a shoulder 101 against which a bimetal disc 102 is clamped by a nut 103 threaded on a reduced end of nut 100. The periphery of bimetal disc 102 rests in a suitable shoulder 104 formed in a supporting ring 105, and the upper end of valve stem 91 extends through the ring and supports an insulating disc 106 on the underside of which a resistance 107 is secured. The opposite ends of this resistance are electrically connected respectively to a pair of terminals 108 and 109 suitably mounted in a supporting plate 110. A pair of leads 111 and 112 are connected respectively to terminals 108 and 109. Supporting plate 110 and ring 105 are held in spaced relationship on valve body 89 by means of spacers 113 and 114 through which screws 115 extend; screws 115 are threaded into valve body 89. This part of valve 88 accordingly comprises what will hereinafter be termed the outlet end of the valve, the other end of the valve accordingly being described as the inlet end.

The "inlet" end, accordingly, comprises parts substantially similar to those comprising the outlet end. Thus there is secured to valve body 89 a supporting ring 116, a supporting plate 117, a bimetal disc 118, an insulating disc 119, a resistance 120 and terminals 121 and 122, connected respectively to leads 123 and 124. Needle valve 98 is connected to bimetal 118 by a stem 125.

Leads 111 and 112 are connected respectively to thermostatic switch contact 70 and power source 69. Leads 123 and 124 are connected respectively to thermostatic switch contact 87 and power source 69. Assuming that the thermostat is set at the desired temperature, a rise above that temperature causes contact 72 to engage contact 87, thus establishing a circuit between power source 69 and resistance 120 by way of lead 124, terminal 122, resistance 120, terminal 121 and lead 123 back to source 69. Heating of this resistance warps bimetal 118 downwardly moving stem 125 to draw needle valve 98 from its seat in channel 91. As channel 91 is connected to air inlet 16 (Figure 1) air flows through channel 91 (Figure 4), chamber 96, and channel 93 into the radiator, thus increasing the amount of air in the radiator and accordingly decreasing the effective heating surface thereof. When the temperature of the space falls to the desired degree, thermostatic switch 35 reacts to break contact between contacts 72 and 87, thus breaking the circuit of resistance 120 and permitting bimetal 118 to cool. When cool, the bimetal snaps needle valve 98 into its seat to close channel 91, to prevent the entrance of air into the radiator.

Assuming that the temperature in the space drops below that desired, thermostatic switch contact 72 moves to engage contact 70 thus to complete a circuit from power source 69 to resistance 107 by way of lead 112, terminal 108, resistance 107, terminal 109 and lead 111 back to the source. This resistance heats bimetal 102 which snaps upwardly to unseat needle valve 97 from channel 92 and air is thus free to flow from the radiator through channel 92 into chamber 95, thence through channel 90 to the atmosphere. As air escapes from the radiator, steam enters as pointed out above until the effective heating surface of the radiator is increased to that point which provides sufficient heat radiation to raise the temperature of the space to the desired degree. When this temperature is obtained, contacts 70 and 72 separate and break the circuit to resistance 107, permitting bimetal 102 to cool and snap needle valve 97 into its seated position thus preventing further escape of air from the radiator and accordingly additional increase of its effective heating surface.

Preferably air channel 93 opens into a larger channel 125 having a check valve therein comprising a ball 126 and a nipple 127, which permit flow of air in the direction of the arrow but prevent opposite air flow.

It may now be seen that needle valves 97 and 98 do not operate intermittently in the manner of needle valves 59 and 79 of valve 15 (Figure 3). Accordingly valves 97 and 98 (Figure 4) should not open as wide as needle valves 59 and 79 as the average rate and volume of flow of air through each type of valve should be substantially constant. If needle valves 97 and 98 (Figure 4) opened as wide as needle valves 59 and 79 (Figure 3) the radiator might become too hot or too cool. Accordingly, referring to needle valve 97 (Figure 4) as an example, the extent of opening of this valve is adjustable by manipulation of nut 100 on stem 99. According to the position of the nut on the valve stem the travel of the valve is limited.

It may now be seen that air valve 88 may be used in the system shown in Figure 1, the operation of the system being similar except that radio interference is materially diminished.

Referring now to Figure 2, wherein I show a conventional two-pipe system, a boiler 128 is connected to a radiator 129 by a riser 130. Steam thus flows from the boiler through riser 130 to radiator 129 and the condensate is drained from the radiator through a trap 131 similar to trap 14 (Figure 1) and through a return 132 (Figure 2) back to boiler 128. Trap 131 has a pair of parts 133 and 134 which permit drainage of the condensate but which trap the air in the radiator. Riser 130 and return 132 are connected by a pipe 135 which equalizes the steam pressure on both sides of trap 131 to prevent the condensate from being blown out of trap 131 and breaking the air trap. Air valve 15 is attached to radiator 129 substantially the same as described with respect to radiator 10 in Figure 1 and controls the amount of air flowing into or out of the radiator in the manner described in accordance to the dictates of thermostatic switch 35. The air pressure is slightly above the steam pressure and is regulated by way of tank 18 and regulator 23 as described hereinabove. It will be seen accordingly that the principle difference between the one and two-pipe systems is the separate return 132 and the connecting pipe 135 between the riser and return. Otherwise the two-pipe system is substantially the same as the one-pipe system. In so far as the operation of air valve 15 is concerned, both systems are substantially similar although there are particular advantages for my system when used in the single pipe arrangement.

It should now be noted that the boiler in either of the systems shown in Figures 1 and 4 may utilize as a source of heat an automatic oil or coal burner, operation of which may be controlled in any suitable manner to maintain a substantially constant head of steam, as for example by a pressurestat which controls the fuel burner in accordance with boiler pressure. As the steam is always free to flow and does flow at a substantially constant rate to the radiators, all of the valving which would otherwise be necessary is obviated and danger of boiler explosion is precluded. Furthermore, with reference to Figure 1, wherein a system of radiators is shown, each radiator may be under the control of a single thermostat, in contradistinction to the conventional systems wherein one thermostat controls the operation of the original source of heat. Thus the temperature of each of several connected or disconnected rooms, for example, may be maintained at substantially any desired degree merely through adjustment of the thermostat in control of each radiator. It also appears that if desired one thermostat may be connected to control all radiators.

Thus I have provided a heating system and a method of heating which accomplishes the several objects set forth in a thoroughly practical and efficient manner.

As many possible embodiments may be made of the mechanical features of the above invention and as the art herein described might be varied in various parts all without departing from the scope of the invention, it is to be understood that all matter hereinabove set forth or shown in the accompanying drawings is to be interpreted as illustrative and not in a limiting sense.

I claim:

1. The combination with a steam heating system utilizing a radiator wherein the admission of a fluid to or the escape of a fluid from the radiator is controlled to regulate the effective heating surface of the radiator, of a valve connected to the radiator and to a source of fluid under pressure and having a pair of fluid flow controlling parts, one of said parts being operable to admit said fluid to said radiator to reduce the effective heating area thereof and the other of said parts being operable to effect escape of said fluid from said radiator to increase the effective heating area thereof, means for intermittently operating either of said parts independently of each other whereby said fluid is metered into or out of the radiator to vary gradually its effective heating surface, and thermostatic means exclusively responsive to the temperature of the room in which the radiator is located for effecting actuation of said operating means.

2. The combination with a steam heating system utilizing a radiator wherein the admission of a fluid to or the escape of a fluid from the radiator is controlled to regulate the effective heating surface of the radiator, of a valve connected to the radiator and to a source of fluid under pressure and having a pair of fluid flow controlling parts operable between open and closed positions, means for intermittently opening and closing one of said parts to gradually meter fluid into said radiator to decrease its effective heating surface, means for intermittently opening and closing the other of said parts to meter fluid from said radiator to increase its effective heating surface, said parts being adapted to operate independently of each other, and thermostatic means exclusively responsive to the temperature of the room in which the radiator is located for effecting actuation of one or the other of said operating means as the temperature of the room varies.

3. The combination with a steam heating system utilizing a radiator wherein the admission of a fluid to or the escape of a fluid from the radiator is controlled to regulate the effective heating surface of the radiator, of a valve connected to the radiator and to a source of fluid under pressure and having a pair of fluid flow controlling parts, one of said parts being operable to admit said fluid to said radiator and the other of said parts being operable to effect escape of said fluid from said radiator, thermally responsive means for intermittently operating either of said parts independently of each other, whereby said fluid is metered into or out of the radiator to gradually vary its effective heating surface, means for heating said thermally responsive means, and thermostatic means exclusively responsive to the temperature of the room in which the radiator is located for energizing said heating means.

4. The combination with a steam heating system utilizing a radiator wherein the admission of a fluid to or the escape of a fluid from the radiator is controlled to regulate the effective heating surface of the radiator, of a valve connected to the radiator and to a source of fluid under pressure and operable to intermittently admit fluid into said radiator to decrease the effective heating area thereof, a heat responsive member connected to said valve and adapted to operate the valve as its temperature varies, a second valve operable to intermittently exhaust fluid from said radiator to increase the effective heating area thereof, a second heat responsive member connected to said second valve and adapted to operate said second valve if its temperature varies, means for heating said heat responsive members, and a thermostat exclusively responsive to the temperature of the atmosphere surrounding said radiator for effecting energization of said heating means to actuate one or the other of said valves.

5. The combination with a steam heating system utilizing a radiator wherein the admission of a fluid to or the escape of a fluid from the radiator is controlled to regulate the effective heating surface of the radiator, of a valve connected to the radiator and to a source of fluid under pressure and having a fluid flow controlling part, said part being operable to admit said fluid to said radiator, a thermally responsive member connected to said part and adapted when heated to move said part to one operative position and when cooled to move said part to another operative position, means for heating said thermally responsive member, and thermostatic means exclusively responsive to the temperature of the room in which the radiator is located for effecting energization of said heating means.

6. The combination with a steam heating system utilizing a radiator wherein the admission of a fluid to or the escape of a fluid from the radiator is controlled to regulate the effective heating surface of the radiator, of a valve connected to the radiator and to a source of fluid under pressure and having a fluid flow controlling part, said part being operable to admit said fluid to said radiator, a thermally responsive member connected to said part and adapted when heated to move said part to one operative position and when cooled to move said part to another operative position, means for heating said thermally responsive member, means associated with said thermally responsive member for effecting deenergization of said heating means when said member goes to one of its operative positions, whereby said member and accordingly said part operates intermittently to meter the fluid flow and thereby gradually vary the effective heating surface of the radiator, and thermostatic means exclusively responsive to the temperature of the room in which the radiator is located for effecting energization of said heating means.

LAUREN E. SEELEY.